United States Patent
Garaev et al.

(10) Patent No.: US 11,922,183 B2
(45) Date of Patent: Mar. 5, 2024

(54) CROSS-PLATFORM DEPLOYMENT OF APPLICATION

(71) Applicant: Microsoft Technology Licensing, LLC, Redmond, WA (US)

(72) Inventors: Dmitry Dmitrievich Garaev, Redmond, WA (US); Andrey Anatolyevich Lukyanov, Redmond, WA (US); Haruya Shida, Redmond, WA (US); Marc Andrew Power, San Jose, CA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 442 days.

(21) Appl. No.: 17/355,881

(22) Filed: Jun. 23, 2021

(65) Prior Publication Data
US 2022/0413877 A1 Dec. 29, 2022

(51) Int. Cl.
*G06F 8/60* (2018.01)
*G06F 8/61* (2018.01)
*G06F 9/445* (2018.01)
*G06F 21/62* (2013.01)

(52) U.S. Cl.
CPC .............. *G06F 9/4451* (2013.01); *G06F 8/60* (2013.01); *G06F 8/61* (2013.01); *G06F 21/6218* (2013.01); *G06F 2209/501* (2013.01); *G06F 2209/505* (2013.01)

(58) Field of Classification Search
None
See application file for complete search history.

(56) References Cited

U.S. PATENT DOCUMENTS

| 9,197,720 B2 * | 11/2015 | Fernandez-Ruiz ....... G06F 8/60 |
| 9,825,881 B2 | 11/2017 | Johnston et al. |
| 9,882,824 B2 | 1/2018 | Maes et al. |
| 10,356,206 B2 | 7/2019 | Chen et al. |
| 10,742,524 B2 * | 8/2020 | Dytmire ................ G06F 21/602 |

(Continued)

FOREIGN PATENT DOCUMENTS

| CN | 111193782 A | 5/2020 |
| WO | 2020124241 A1 | 6/2020 |

OTHER PUBLICATIONS

"International Search Report and Written Opinion Issued in PCT Application No. PCT/US22/029115", dated Aug. 10, 2022, 12 Pages.

(Continued)

*Primary Examiner* — Philip Wang
(74) *Attorney, Agent, or Firm* — Christopher J Volkmann; Kelly, Holt & Christenson, PLLC (57) ABSTRACT

A cross-platform deployment computing system receives an application to be deployed to a cloud. The application is parsed to identify assignment criteria and is assigned to an application availability group the defines security that defines a topology in which the application will be deployed. The application is then provided to a control plane for deployment at a target remote server architecture. In order to deploy the application to a different remote server architecture, the control plane for the different remote server architecture accesses the deployment definitions in the AAG and deploys the application to the different remote server architecture using the deployment definitions in the AAG to which the application is assigned.

20 Claims, 7 Drawing Sheets

(56) References Cited

U.S. PATENT DOCUMENTS

| | | | |
|---|---|---|---|
| 10,965,752 B1 | 3/2021 | Smith | |
| 11,080,096 B1* | 8/2021 | Fakhouri | G06F 9/5072 |
| 11,797,352 B2* | 10/2023 | Moyer | G06F 9/5072 |
| 2004/0190502 A1* | 9/2004 | Sharma | H04Q 3/54583 370/360 |
| 2011/0225277 A1* | 9/2011 | Freimuth | G06F 9/45558 718/1 |
| 2013/0191531 A1* | 7/2013 | Kruglick | H04L 43/55 709/224 |
| 2016/0043970 A1* | 2/2016 | Jacob | H04L 67/60 709/226 |
| 2016/0072899 A1* | 3/2016 | Tung | H04L 41/145 709/223 |
| 2016/0366246 A1* | 12/2016 | Battle | G06F 9/5055 |
| 2017/0041189 A1* | 2/2017 | Aswathanarayana | H04L 67/34 |
| 2017/0123777 A1* | 5/2017 | Mittal | G06F 8/20 |
| 2018/0060106 A1* | 3/2018 | Madtha | G06F 16/951 |
| 2020/0379793 A1 | 12/2020 | Parihar et al. | |
| 2020/0379812 A1 | 12/2020 | Ranjan et al. | |

OTHER PUBLICATIONS

Tricomi, et al., "Orchestrated Multi-Cloud Application Deployment in OpenStack with TOSCA", In proceedings of 2017 IEEE International Conference on Smart Computing (SMARTCOMP), May 29, 2017, 6 Pages.

Antoniades, et al., "Enabling Cloud Application Portability", In Proceedings of International Conference on Utility and Cloud Computing, Dec. 7, 2015, pp. 354-360.

Bailey, et al., "IBM joins the Crossplane community", Retrieved from: https://developer.ibm.com/technologies/containers/blogs/IBM-joins-the-crossplane-community/, Dec. 15, 2020, 6 Pages.

Matyas, Janos, "Four ways to build hybrid clouds with Kubernetes", Retrieved from: https://banzaicloud.com/blog/hybrid-cloud-kubernetes/, Feb. 27, 2020, 13 Pages.

Meisner, et al., "Using Terraform to Manage Multiple Kubernetes Clusters On-Premises and in the Cloud", Retrieved from: https://www.hashicorp.com/blog/using-terraform-to-manage-multiple-kubernetes-clusters-on-premises-and-cloud, Sep. 10, 2020, 7 Pages.

Melanson, Mike, "IBM Cloud Adopts the Kubernetes-Based Crossplane Control Plane", Retrieved from: https://thenewstack.io/IBM-cloud-adopts-the-kubernetes-based-crossplane-control-plane/, Dec. 29, 2020, 13 Pages.

Munisso, et al., "CloudMapper: A Model-Based Framework for Portability of Cloud Applications Consuming PaaS Services", In Proceedings of Euromicro International Conference on Parallel, Distributed and Network-based Processing (PDP), Mar. 6, 2017, 8 Pages.

* cited by examiner

CROSS-PLATFORM DEPLOYMENT OF APPLICATION

BACKGROUND

Computing systems are currently in wide use. Some computing systems run applications on a cloud-based computing system platform.

For example, a computing system platform may a set of computing resources that allow users to run one or more applications in a remote server environment, such as in a cloud. A control plane may be a part of a cloud deployment pipeline that is in charge of validating and deploying an application in a computing system capacity of the remote server environment. Different computing system platforms have different control planes.

The different remote server environments (e.g., different clouds) may be geographically distributed across the world. The control planes in each of those geographically distributed remote server environments may need to have applications or payloads configured in different ways in order to properly deploy them.

To deploy an application to a cloud, an application is authored to produce application code or binaries, along with configuration information. The configuration information may include values that are used to run the application as desired by the developer. When an application is deployed to a capacity on a remote server environment (or cloud) the application may have a number of different instances running in that cloud.

The discussion above is merely provided for general background information and is not intended to be used as an aid in determining the scope of the claimed subject matter.

SUMMARY

A cross-platform deployment computing system receives an application to be deployed to a first platform. The application is parsed to identify assignment criteria and is assigned to an application availability group (AAG) that has deployment definitions that define how the application will be deployed. The application is then provided to a control plane for deployment at the first platform using the deployment definitions in the AAG. In order to deploy the application to a second platform, the control plane for the second platform accesses the deployment definitions in the AAG to which the application is assigned and deploys the application to the second platform using the deployment definitions in the AAG to which the application is assigned.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, an application may need to be configured differently for deployment on different remote server architectures (or clouds), because the control planes that are responsible for validating and deploying an application may expect different configuration information in the different remote server architectures. Therefore, it can be difficult for an application to be deployed on multiple different platforms (e.g., in multiple different clouds or remote server architectures with different control planes) without substantially reworking the application to make the application suitable for deployment by the control planes of the different clouds or remote server architectures.

Some current systems thus allow a developer of an application to design an application model in a way so that it can be more easily adapted for deployment on different clouds. However, such current systems are primarily used with relatively small deployments, such as a deployment that may utilize a relatively small number of instances deployed in a single cloud. Such systems do not address many difficulties that are encountered when attempting to perform cross-platform deployment of a large application which may be deployed according to a geographically distributed topology. This is because the topology in different remote server architectures is often managed differently.

Similarly, it is difficult to author an application for deployment on different clouds but still have the application be deployed using a common set of safe deployment practices. Safe deployment practices are the practices used to expose the application gradually to larger and larger sets of users with the purpose of ensuring overall application availability and validating new changes and catching regressions. These larger and larger deployment environments are sometimes called "rings"—such as a development ring, a test ring, and a production ring, etc.

It is also difficult to author an application for deployment to different clouds but still have the application handle secret information property. Some secret information to be managed includes certificates, tokens, and different secure information. Similarly, it can be difficult to manage the handling of secret information across platforms. This is often because, when an application is deployed to a cloud, the application receives an identity from an identity provider. That identity is used to determine the security level of the application, and to identify the different secret information that the application has access to. The identity may also be used to obtain secret tokens, certificates, and other types of security information used for authentication and authorization of the application. When the application is deployed in a different cloud, the application may receive a different identity from a different identity provider so that the handling of secure or secret information can be cumbersome.

Still other runtime characteristics that can be difficult to manage when an application is deployed across multiple different platforms include failure mode processing. Failure mode processing is processing that occurs when an instance of an application fails and thus becomes unusable or inaccessible. In that case, there are different options for how calls to that instance of the application may be handled. The calls may be rerouted to other instances in other clouds, or they may be handled in different ways. This is referred to as failure mode processing. Failure mode processing may change based upon the particular platform that the application is deployed in.

The present description thus proceeds with respect to a cross-platform deployment computing system that defines different application availability groups (AAGs). An AAG has a set of definitions that will be applied to each application that is assigned to that AAG regardless of the cloud or platform the application is deployed on. For example, the definitions may include a topology definition which defines how an application will be deployed across multiple different geographies, regardless of which platform the application is deployed on. The definitions in the AAG may include a failure mode definition which defines the failure mode processing that will be applied to that application regardless of which cloud or remote server architecture (e.g., regardless of which platform) it is deployed on. The definitions in the AAG may include a safe deployment practices definition that will also be applied to applications assigned to that AAG. The present system also includes an identity management system that manages the identity of an application, regardless of which remote server architecture or cloud (or platform) it is deployed on.

When an application is received by the cross-platform deployment computing system, the application is parsed to identify assignment criteria that are used to assign the application to a particular AAG. The application is also given an identity using an identity provider so that the identity can be used in processing and accessing secret information, such as in obtaining security tokens, certificates, and in accessing other secure or secret information in a secrets datastore. The application is then sent to a cloud control plane in the cloud or platform where the application is to be deployed. The deployment definitions from the AAG are also applied. When the application is to be deployed in a second cloud (or on a different platform), the same deployment definitions are applied from the AAG. Also, the identity management system maintains the original identity of the application so that the original identity provider can be used even when the application is deployed to the second cloud or platform. Similarly, the AAG to which the application is assigned defines the topology for deployment of the application in the second cloud (or platform) and defines the failure mode processing and deployment practices that will be used with that application in the second cloud (or platform). The topology definition may include a sequence of deployment steps for deploying instances of the application across the capacity of platforms on which the application is performed. The deployment definitions in the AAG are defined in a cloud-independent (or platform-independent) fashion so that the definitions can be used, regardless of the particular cloud or platform that the application is deployed on.

Figure 1:
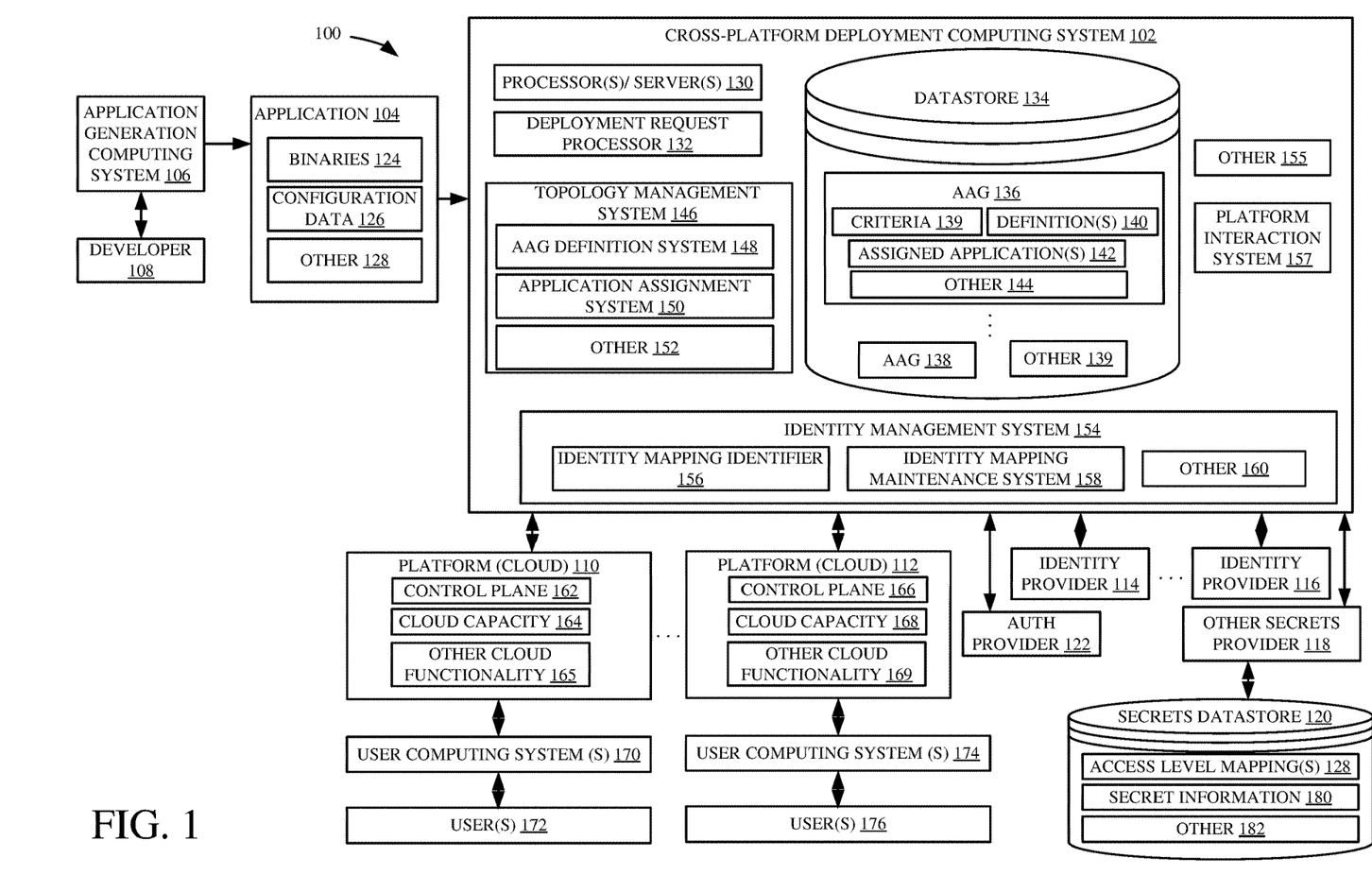
FIG. 1 is a block diagram of one example of a computing system architecture.

FIG. 1 is a block diagram of one example of a computing system architecture 100 which includes a cross-platform deployment computing system 102 that receives an application 104 from an application generation computing system 106 which is used by one or more developers 108 to generate application 104. Cross-platform deployment computing system 102 is also shown communicating with a plurality of different platforms 110-112. For purposes of the present description, a platform can mean a particular cloud or remote server environment where applications (such as hosted applications and services) can run. Each platform may be geographically distributed. FIG. 1 also shows that cross-platform deployment computing system 102 can communicate with a plurality of different identity providers 114-116, with other secret provider 118 (which itself, can provide access to secret information in secrets datastore 120), and one or more Auth providers 122 which can be used to provide authorization and authentication services, such as to provide and validate tokens, certificates, etc.

Application 104 can include binaries 124, configuration data 126, and other information 128. Cross-platform deployment computing system 102 can include one or more processors or servers 130, deployment request processor 132, and datastore 134. Datastore 134, itself, can include AAGs 136-138 and other items 139, with each AAG having assignment criteria 139 and having a set of definitions 140 and an indication of which applications are assigned to it, as indicated by block 142, and other items 144. Cross-platform deployment computing system 102 can also include topology management system 146 which can include AAG definition system 148, application assignment system 150, and other items 152. Computing system 102 can also include identity management system 154 which, itself, can include identity mapping identifier 156, identity mapping maintenance system 158, and other items 160. System 102 can also include platform interaction system 157 and other items 155.

Each of the platforms 110-112 can have its own control plane and capacity. Therefore, platform 110 can include control plane 162 and capacity 164 as well as other cloud functionality 165. Platform 112 can include control plane 166 and capacity 168 as well as other cloud functionality 169. The control plane on each platform is illustratively part of the deployment pipeline and is in charge of validating and deploying an application to the corresponding capacity. The capacity may be arranged in clusters of machines so that an application may be deployed to one or more clusters. Also, the clusters may be arranged in rings. For example, one ring may be a test ring where an application is deployed for testing. Another ring may be a ring that is more widely available to users than the test ring, and a third ring may be a production ring where the application is widely available to large numbers of users. Thus, FIG. 1 shows that one or more user computing systems 170 can be used by users 172 to access applications deployed in cloud capacity 164. One or more user computing systems 174 can be used by users 176 to access applications deployed in cloud capacity 168.

FIG. 1 also shows that secrets datastore 120 can include a set of access level mappings 178 that map application identifiers to an access level so that, based upon the access level, the application may have access to different levels of secret information 180 in secrets datastore 120. Secrets datastore 120 may include other items 182 as well.

Before describing the overall operation of architecture 100, a brief description of some of the items in architecture 100, and their operation, will first be provided.

As discussed above, application 104 may include binaries 124 and configuration data 126. The configuration data 126 may be data that indicates how the application is to be run. The configuration data may indicate a number of instances of the application that are to be deployed, location(s) where the application is to be deployed, among other things.

Deployment request processor 132 receives a deployment request from application generation computing system 106 or another computing system indicative of a request to deploy application 104. The request may include a target platform (such as one or more of platforms 110-112) where the application is to be deployed.

Topology management system 146 can be used to define AAGs and the criteria 139 that will be used to assign applications to the AAGs. System 146 can also be used to assign applications to the AAGs based upon the criteria 139. AAG definition system 148 can be used by a user or another system to define an AAG and store the AAG in datastore 134. Each AAG 136-138 may thus have a set of deployment definitions that define things common to that AAG, and may include a set of application indicators that identify the assigned applications 142 that have been assigned to that AAG.

Thus, after deployment request processor 132 receives a request to deploy an application 104 to a particular platform, application assignment system 150 parses the application 104 to identify traits or characteristics of the application 104 and compares those traits or characteristics to criteria 139 to find which AAG 136-138 the application 104 should be assigned to and then assigns the application 104 to that AAG. For purposes of the present discussion, it will be assumed that application 104 is assigned to AAG 136.

The identity management system 154 can interact with one or more different identity providers 114-116 to obtain or access an identity for the application 104. That identity can be used to access authorization information (such as tokens, certificates, etc.) from Auth provider 112 and to access other secret information 180 through other secrets provider 118. Identity management system 154 uses identity mapping identifier 156 to generate or obtain an access level mapping 128 that maps the identity of application 104 to an access level in datastore 120. The access level indicates what level of access application 104 will have to secret information 180 in datastore 120. Identity mapping maintenance system 158 can be used to maintain the identity of application 104 and to interact with the same identity provider 114-116 regardless of which particular platform 110-112 the application 104 is deployed on. Therefore, even if application 104 is subsequently deployed on a different platform (e.g., on platform 112), the application 104 will have the same application ID and interact with the same identity provider as when it was deployed on platform 110.

Platform interaction system 157 then outputs the application 104 to the target platform (for purposes of the present discussion, it will be assumed that the target platform is platform 110). The control plane 162 in the target platform 110 then validates and deploys the application 104 to the cloud capacity 164 in platform 110. It will be appreciated that the cloud capacity 164 may be geographically distributed among a number of different locations within the cloud or platform 110. In another example, the cloud capacity 164 may be all contained at a single location. Platform interaction system 157 outputs to control plane 162 the information in the definitions 140 of the AAG 136 to which application 104 is assigned so that control plane 162 can deploy the application using those definitions 140 and so that cloud capacity 164 can run the application using those definitions.

If deployment request processor 132 receives a request to deploy application 104 to a different platform (such as platform 112), platform interaction system 157 can output the application 104 to platform 112 along with the same definitions 140 from the AAG 136 to which application 104 is assigned. Therefore, even if the application 104 is to be deployed at a different platform 112, the definitions 140 will follow the application so that the control plane 166 in platform 112 will deploy the application according to the topology defined in definitions 140 and the sequence of steps for deploying instances of the application 104 across the capacity 168 of the different platform 112 using the deployment practices defined in definitions 140, and so that cloud capacity 168 in platform 112 will run the application using those same definitions 140. Similarly, the identity mapping maintenance system 158 will maintain the same application identity for application 104 so that system 158 can communicate with the same identity provider 114. Thus, Auth provider 122 can provide authorization information (such as certificates, tokens, etc.) in the same way, even though application 110 is now deployed on a different platform 112. Similarly, other secrets provider 118 will use the same access level mappings 128 (because the application identity is the same) for application 104 even though application 104 is now deployed on a different platform 112.

Figure 2:
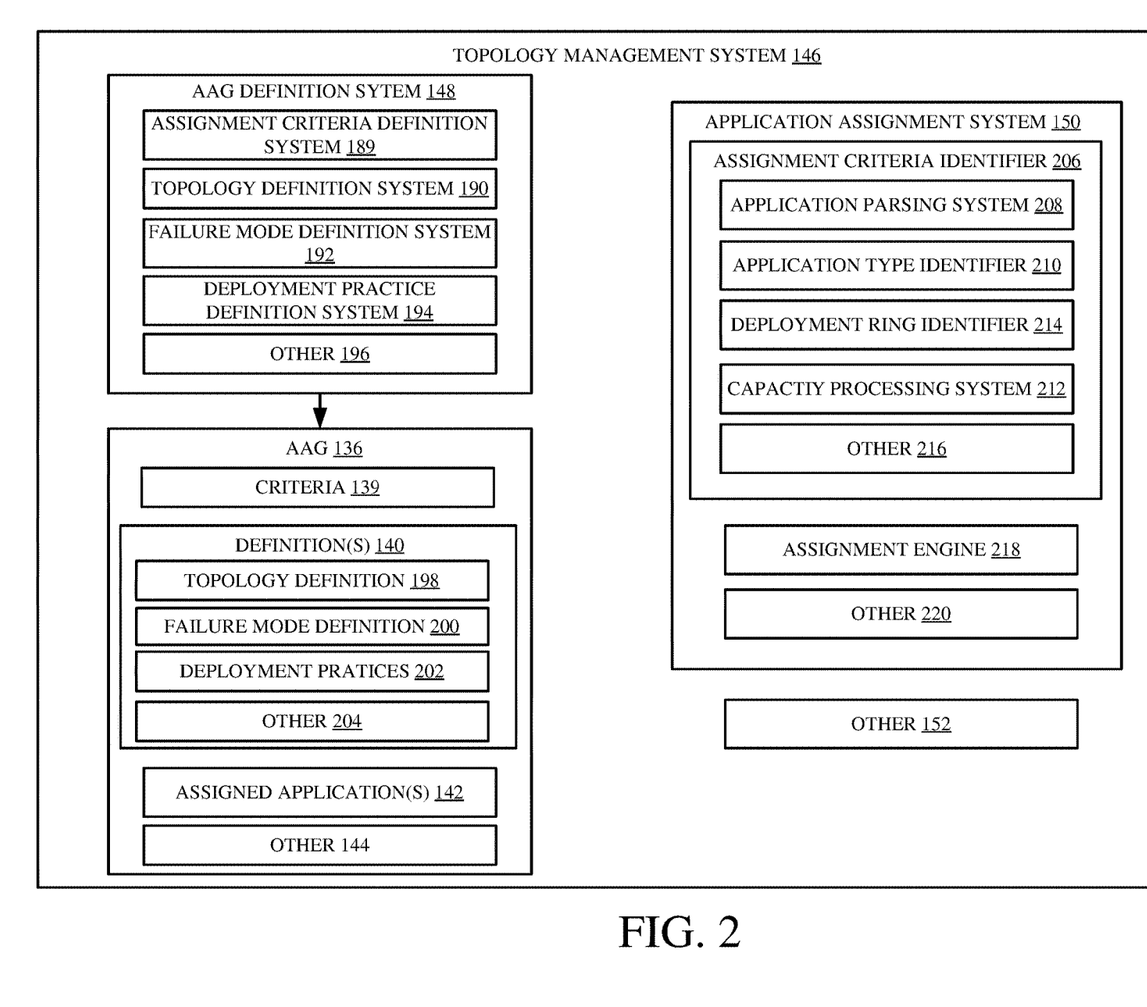
FIG. 2 is a block diagram showing one example of a topology management system.

FIG. 2 is a block diagram showing one example of topology management system 146 in more detail. In the example shown in FIG. 2, topology management system 146 shows AAG definition system 148 and application assignment system 150 in more detail. FIG. 2 also shows one example of AAG 136 in more detail as well. FIG. 2 shows that AAG definition system 148 may include assignment criteria definition system 189, topology definition system 190, failure mode definition system 192, deployment practice definition system 194, and other items 196. FIG. 2 shows that the definitions 140 and AAG 136 may include assignment criteria 139, topology definition 198, failure mode definition 200, deployment practices 202, and other items 204. FIG. 2 also shows that application assignment system 150 includes assignment criteria identifier 206 which, itself, may include application parsing system 208, application type identifier 210, capacity processing system 212, deployment ring identifier 214, and other items 216. Application assignment system 150 may also include assignment engine 218 and other items 220. Prior to describing the overall operation of architecture 100 and topology management system 146 in more detail, a brief description of some of the items in topology management system 146, and their operation, will first be provided.

AAG definition system 148 illustratively exposes an interface that can be accessed by a user or another system to define different AAGs 136. There may be multiple different types of AAGs based upon how they are defined so the criteria for assigning an application to an AAG may differ with each type of AAG. Therefore, assignment criteria definition system 189 exposes an interface that can be used to define the criteria 139 that are evaluated or used to assign an application to the AAG.

Topology definition system 190 exposes an interface that allows the topology over which an application is to be installed to be defined. The topology may identify a distribution of instances of the application across a geographic region or multiple geographic regions, the number of instances in each geography, the rings in which the instances are deployed, among other things.

Failure mode definition system 192 exposes an interface that allows the failure mode processing for an application assigned to the AAG to be defined. The failure mode processing definition defines how requests for an application are rerouted when an instance of an application or a cluster where the application is deployed becomes inaccessible due to failure or for another reason. For instance, when a cloud at a first geographic location goes down or becomes inaccessible, or when the application in that cloud becomes inaccessible, the calls to the application may be rerouted to one or more instances of the application deployed at a geographically distributed cloud in a different geographic location. There are a variety of different ways that calls can be rerouted, and failure mode definition system 192 exposes an interface that allows for the failure mode processing corresponding to the AAG to be defined.

Deployment practice definition system 194 exposes an interface to define the deployment practices that will be used in deploying the application through different deployment rings. For instance, there may be different criteria used in determining when to move an application from a test ring to a production ring. Deployment practice definition system 194 exposes an interface that allows the deployment practices to be defined.

Once the assignment criteria and definitions are generated from systems 189, 190, 192, and 194, those definitions are embodied as definitions 140 in an AAG 136. Thus, AAG 136 includes criteria 139 generated using assignment criteria definition system 189, and definitions 140 include the topology definition 198 generated using topology definition system 190, failure mode definition 200 generated using failure mode definition system 192, and deployment practices 202 generated using deployment practice definition system 194.

Once AAG 136 is defined, application assignment system 150 can assign applications to AAG 136. AAG 136 can itself include identifiers indicative of assigned applications 142. The assignment indicators can be stored elsewhere, outside of AAG 136, as well.

In order for application assignment system 150 to assign an application to an AAG, assignment criteria identifier 206 identifies certain criteria in the application, such as traits or characteristics of the application, that can be used to choose the particular AAG to which the application will be assigned. Application parsing system 208 may parse the application into different sections where assignment criteria may be found. Application type identifier 210 may identify the particular type of the application as one set of assignment criteria. For instance, the application may be a media application, a productivity application, or any of a wide variety of other types of applications. The application may be exposed to users or external systems at a variety of different levels or in different ways, and the way the application is exposed can be used as assignment criteria. These and other application types are contemplated herein.

Deployment ring identifier 214 identifies the particular deployment ring for which deployment of the application is requested. For instance, if the application is to be deployed in a test ring, it may be assigned to one AAG, whereas if it is to be deployed in a production ring, it may be assigned to a different AAG.

Capacity processing system 212 can consider capacity in assigning the application to an AAG. For instance, if the deployment request has requested that a first number of instances of the application be deployed, then the capacity processing system 212 may indicate that the application may be assigned to one AAG, whereas if the deployment request requests that a second number of instances of the application be deployed, then the capacity processing system 212 may indicate that the application should be assigned to a different AAG.

Based upon the assignment criteria identified by assignment criteria identifier 206, assignment engine 218 assigns the application to a particular AAG. Assignment engine 218 may use a variety of different mechanisms or algorithms in making the assignment. For instance, certain criteria may be weighted more heavily than other criteria in assigning the application to an AAG. Assignment engine 218 may thus preferentially match certain criteria found in the application to the criteria 139 corresponding the different types of AAGs, using a weighted algorithm, in order to identify a best matching AAG, that the application is to be assigned to.

Assignment engine 218 can use any of a wide variety of other algorithms to assign an application to an AAG as well.

Platform interaction system 159 can handle interactions with platforms 110-112.

Figure 3A:
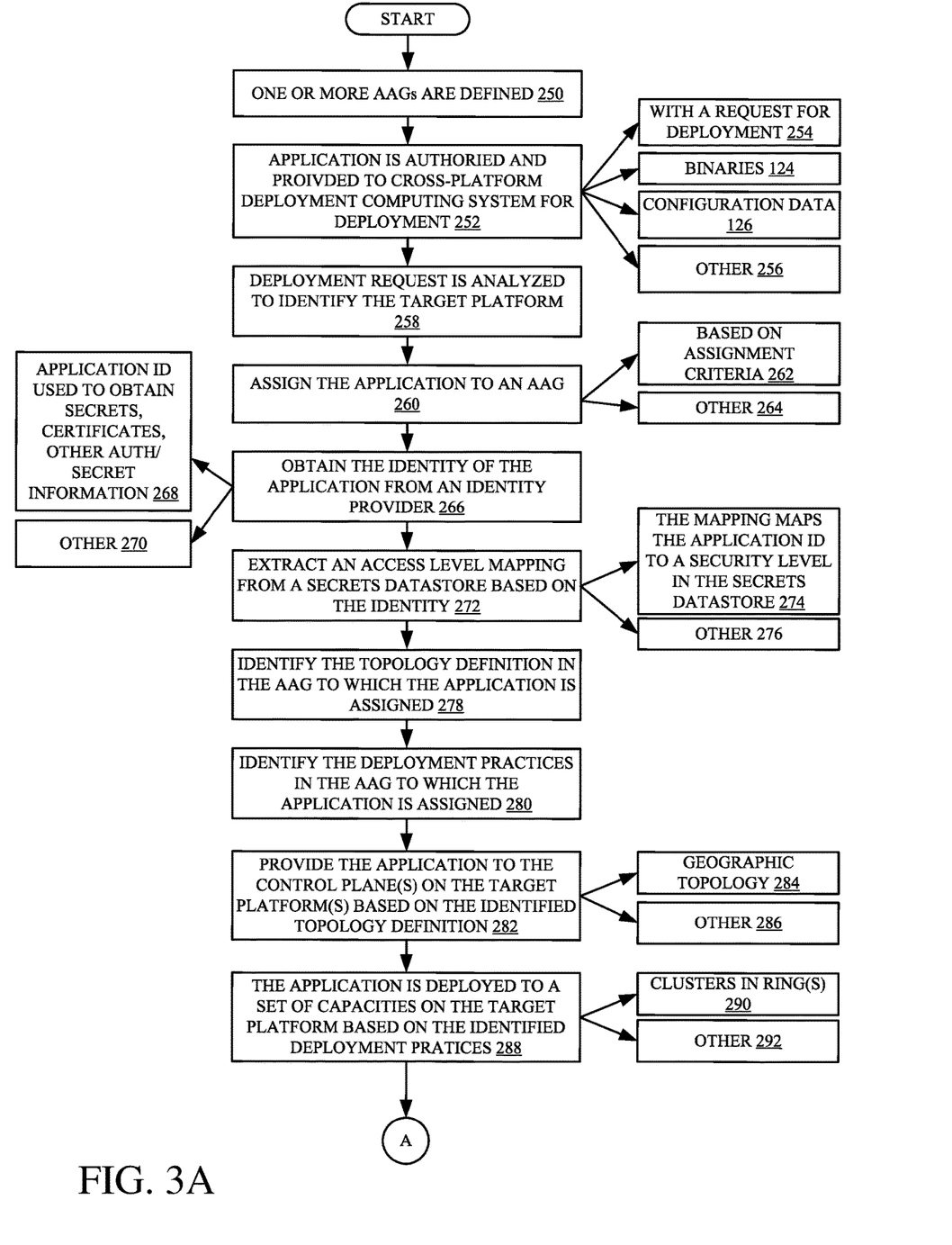
FIGS. 3A and 3B (collectively referred to herein as FIG. 3) show a flow diagram illustrating one example of the operation of a cross-platform deployment computing system.
Figure 3B:
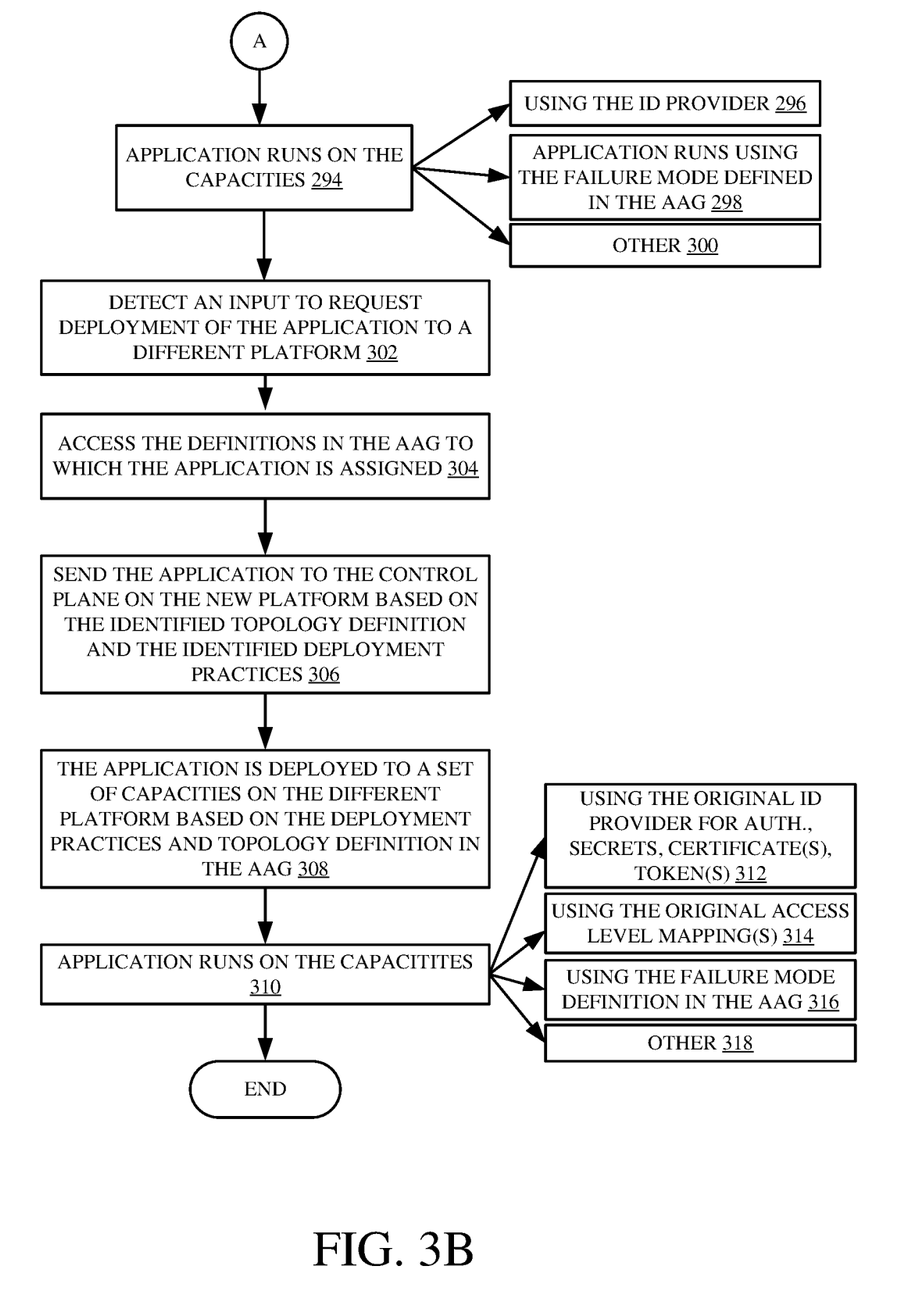

FIGS. 3A and 3B (collectively referred to herein as FIG. 3) show a flow diagram illustrating one example of the operation of cross-platform deployment computing system 102 and topology management system 146. It is first assumed that one or more AAGs have been defined to include a set of assignment criteria and definitions as discussed above. Definition of an AAG is also described in greater detail below. Having one or more AAGs defined is indicated by block 250 in the flow diagram of FIG. 3.

Application 104 is authored by developer 108 at application generation computing system 106 and is provided to cross-platform deployment computing system 102 for deployment to a platform. This is indicated by block 252 in the flow diagram of FIG. 3. The application 104 can be provided along with a request for deployment, as indicated by block 254, and the application 104 may include binaries 124 and configuration data 126. The application may be provided in other ways and include other information as well, as indicated by block 256.

Deployment request processor 132 then analyzes the deployment request to identify the target platform 110-112 on which application 104 is to be deployed. Analyzing the deployment request is indicated by block 258 in the flow diagram of FIG. 3. For the purposes of the present discussion, it is assumed that the target platform is platform 110.

Application assignment system 150 then extracts and analyzes assignment criteria and assigns application 104 to an AAG. For purposes of the present discussion, it will be assumed that application 104 has been assigned to AAG 136 based upon the assignment criteria.

Assigning the application to an AAG is indicated by block 260. Analyzing the assignment criteria and comparing them to criteria 139 in the various AAGs to perform the assignment is indicated by block 262. The application can be assigned to an AAG in a wide variety of other ways as well, as indicated by block 264.

Identity management system 154 interacts with an identity provider 114-116 to obtain or access an identity for the application, as indicated by block 266. For purposes of the present discussion, it will be assumed that identity management system 154 interacts with identity provider 114 to obtain or access the identity for application 104. The application identity is used to obtain secrets, certificates, other authorization or authentication information and other secret information, as indicated by block 268. The identity of the application can be obtained or accessed in other ways as well, as indicated by block 270.

Identity mapping identifier 156 then extracts an access level mapping 128 from secrets datastore 120 based on the application identity, as indicated by block 272. The mapping can map the application identity to a security level in the secrets datastore 120, as indicated by block 274. The mapping may indicate a wide variety of other information as well, as indicated by block 276.

Regardless of which platform the application is to be deployed on, Platform interaction system 157 then extracts the topology definition 198 in the AAG 136 to which application 104 has been assigned. Extracting a topology definition is indicated by block 278 in the flow diagram of FIG. 3.

Also, regardless of which platform the application is to be deployed on, Platform interaction system 157 also identifies the deployment practices 202 in the AAG 136 to which application 104 has been assigned. Identifying the deployment practices is indicated by block 280 in the flow diagram of FIG. 3.

Platform interaction system 157 provides application 104 to the particular control plane or control planes in the platforms to which the application is to be deployed, based upon the identified topology definition. This is indicated by block 282 in the flow diagram of FIG. 3. For purposes of the present discussion, it is assumed that the topology definition indicates that a given number of instances of application 104 are to be deployed in cloud capacity 164 by control plane 162. Therefore, platform interaction system 157 provides the application to control plane 162 for deployment on cloud capacity 164. The topology definition may be a geographically disbursed topology definition in which case the application may be provided to control planes in different geographical regions. This is indicated by block 284 in the flow diagram of FIG. 3. The application can be provided to the control plane in the target platform in other ways as well, as indicated by block 286.

The control plane then deploys the application 104 to a capacity on the target platform 110 based upon the identified deployment practices, as indicated by block 288 in the flow diagram of FIG. 3. The capacities may be clusters of machines or services that are arranged in different rings, as indicated by block 290. The application can be deployed to the capacities in other ways as well, as indicated by block 292.

The application then runs on the cloud capacities 164, as indicated by block 294 in the flow diagram of FIG. 3. The application runs using the identity provider 114, as indicated by block 296. Therefore, if the application needs secret information from secrets datastore 120, it can use its identity to obtain authentication and authorization information from Auth provider 122, to obtain certificates, access tokens, etc. The application 104 also runs on cloud capacity 164 using the failure mode processing defined in the failure mode definition 200 in AAG 136, as indicated by block 298. The application can run using other information and in other ways as well, as indicated by block 300.

At some point, deployment request processor 132 detects an input that requests the deployment of application 104 to a different platform 112. This is indicated by block 302. Platform interaction system 157 then accesses the definitions 140 in the AAG 136 to which application 104 is assigned, as indicated by block 304 in the flow diagram of FIG. 3. Application interaction system 157 then sends application 104 to the control plane 166 on the new platform 112 based upon the identified topology and the identified deployment practices in the definitions 140 of the AAG 136 to which application 104 is assigned. For instance, if the topology definition indicates that the application is to be deployed in different geographic areas on platform 112, then that is provided to control plane 166, for deployment in the different geographic areas. Similarly, the deployment practices indicate when to deploy the application 104 to different rings in on the platform 112. Sending the application 104 to the control plane 166 on the new platform 112 based on the topology definition and the identified deployment practices is indicated by block 306 in FIG. 3.

The control plane 166 on the new platform 112 then deploys the application 104 to the cloud capacity 168 on the new platform 112 based upon the deployment practices and topology definition, as indicated by block 308. The application 104 then runs on the new cloud capacity 168, as indicated by block 310. Identity management system 154 maintains the original identity of application 104 that it obtained or accessed when deployed on platform 110. Therefore, identity mapping maintenance system 158 enables the application 104 to obtain secret information and authorization and authentication information using the same application identity, as indicated by block 312.

The identity mapping identifier 156 can continue to use the original access level mappings 128 in order to obtain secret information from secrets datastore 120. Using the original access level mappings is indicated by block 314 in the flow diagram of FIG. 3. The application 104 runs on cloud capacity 168 using the same failure mode processing defined in the failure mode definition 200 in AAG 136, as indicated by block 316. The failure mode definition 200 in the AAG 136 thus follows the application 104, regardless of which platform it is deployed on, because the failure mode definition 200 for application 104 (e.g., the failure mode definition 200 in AAG 136) is communicated to control plane 166 and cloud capacity 168 so that, in the event of failure of instances of application 104, calls are rerouted as defined in the failure mode definition 200. Application 104 can run on cloud capacity 168 in a wide variety of other ways as well, as indicated by block 318 in the flow diagram of FIG. 4.

Figure 4:
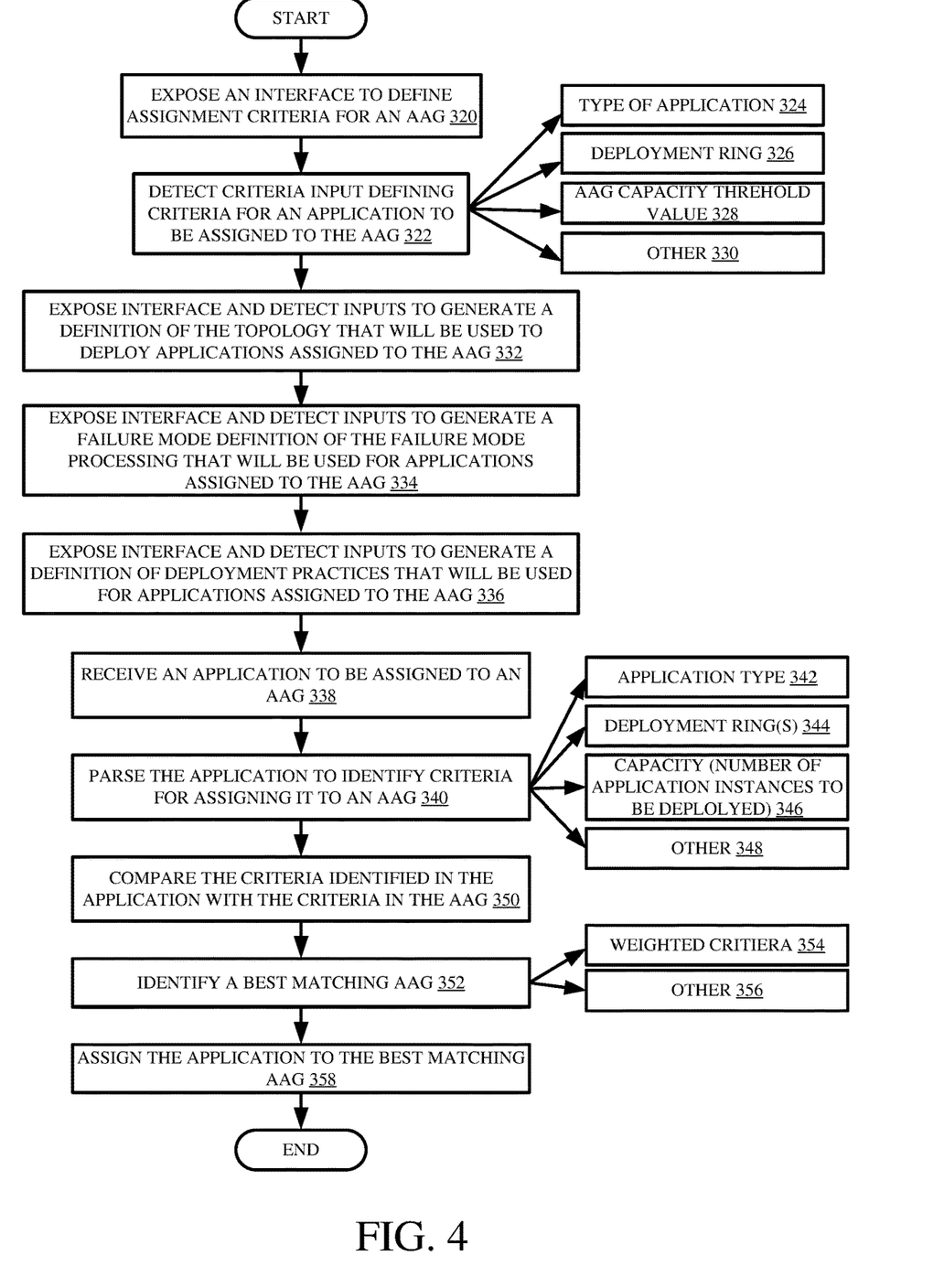
FIG. 4 is a flow diagram illustrating one example of the operation of an application availability group definition system and an application assignment system.
Figure 5:
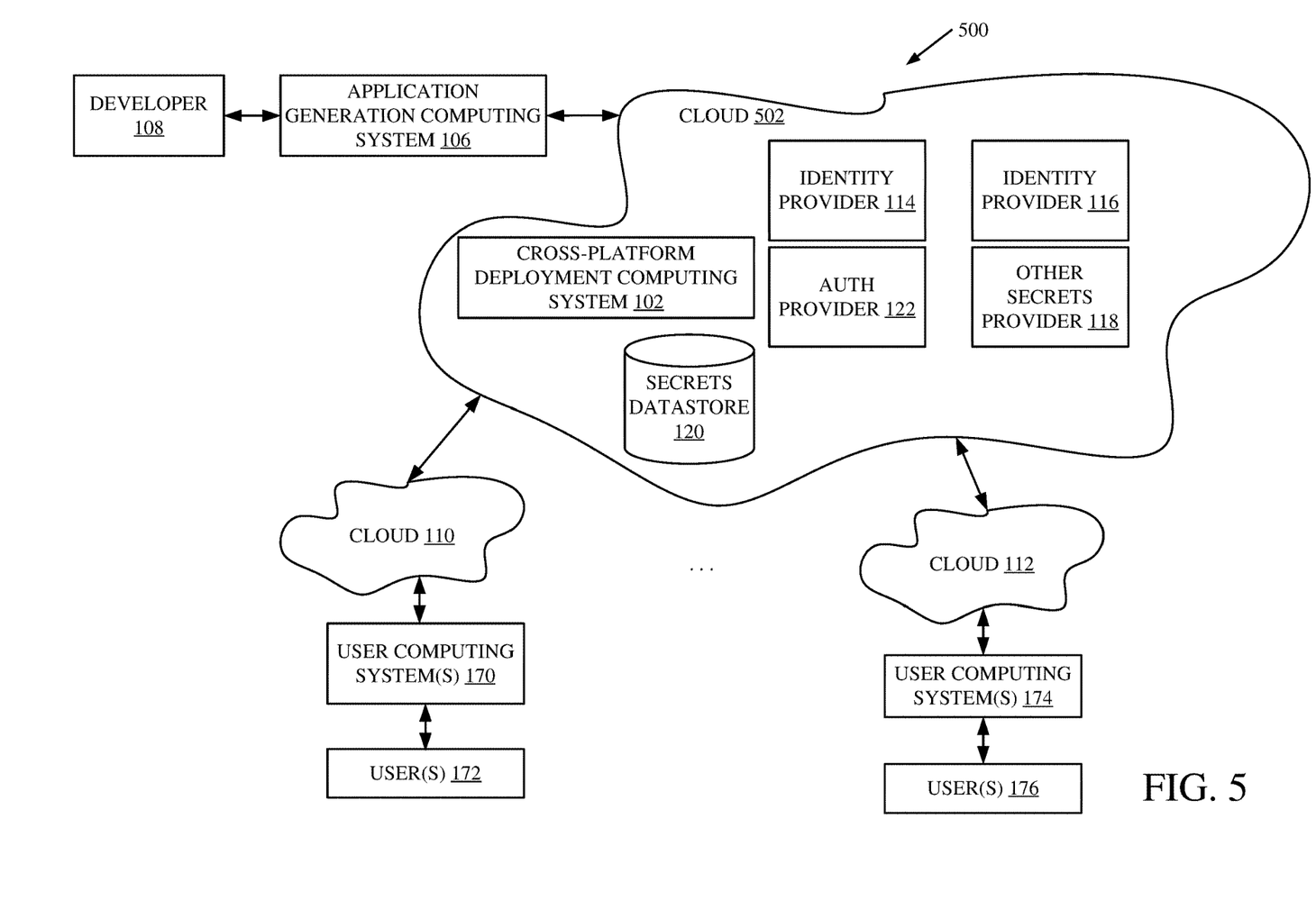
FIG. 5 is a block diagram showing one example of a remote server architecture.

FIG. 5 is a flow diagram illustrating one example of the operation of topology management system 146 in defining an AAG 136 and assigning an application to it. Assignment criteria definition system 189 exposes an interface that can be utilized to define assignment criteria 139 for AAG 136. Exposing the interface is indicated by block 320 in the flow diagram of FIG. 4. The assignment criteria definition system 189 then detects criteria input defining assignment criteria 139 for an application to be assigned to the AAG, as indicated by block 322. The criteria input may be a type of application 324 that should be assigned to the AAG, an application that targets a certain set of deployment rings 326, and an AAG capacity threshold value 328. The assignment criteria inputs can indicate a wide variety of other assignment criteria 330 as well.

Topology definition system 190 then exposes an interface and detects inputs to generate a definition of the topology that will be used to deploy applications assigned to AAG 136. Exposing the interface and generating the topology definition is indicated by block 332 in the flow diagram of FIG. 4.

Failure mode definition system 192 then exposes an interface and detects inputs to generate a failure mode definition 200 which defines failure mode processing that will be used for applications assigned to the AAG. Exposing the interface and generating a failure mode definition is indicated by block 334 in the flow diagram of FIG. 4.

Deployment practice definition system 194 then exposes an interface and detects inputs to generate a definition of deployment practices that will be used for applications assigned to the AAG. Exposing the interface and generating a definition of deployment practices is indicated by block 336 in the flow diagram of FIG. 4.

Application assignment system 150 then receives an application 104 to be assigned to an AAG, as indicated by block 338. Application parsing system 208 then parses the application 104 to identify the various assignment criteria that are being used to assign the application to an AAG. Parsing the application to identify the assignment criteria is indicated by block 340. For example, application type identifier 210 can identify the application type 342. Deployment ring identifier 214 can identify the deployment rings 344 where the application is to be deployed. Capacity processing system 212 can identify the number of application instances to be deployed, as indicated by block 346. A wide variety of other criteria can be detected as well, as indicated by block 348.

Once the criteria are extracted from the application, assignment engine 218 compares the extracted assignment criteria from the application to the assignment criteria 139 corresponding to each of the AAGs to identify an AAG that has assignment criteria 139 that best matches the criteria extracted from the application. Comparing the criteria is indicated by block 350 and identifying a best matching AAG is indicated by block 352 in the flow diagram of FIG. 4. Assignment engine 218 can employ an algorithm that weights the various criteria, as indicated by block 354, or identifies a best matching AAG in a wide variety of other ways as indicated by block 356.

Once assignment engine 218 identifies the best matching AAG, the application 104 is assigned to the best matching AAG so that the various definitions in the best matching AAG can be applied to the application for deployment across different platforms and for running the application on different platforms. Assigning the application to the best matching AAG is indicated by block 358 in the flow diagram of FIG. 4.

It can thus be seen that the present description describes a system in which deployment considerations for deploying a large application across multiple different clouds or platforms are defined in a plurality of different AAGs. When an application is received for deployment, it is analyzed and assigned to an AAG, so that the deployment considerations in the AAG are used for that application, regardless of the different platform or cloud to which it is deployed. This makes it much more efficient to deploy an application across multiple different platforms or clouds.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the actuators can be actuated using a point and click device (such as a track ball or mouse). The actuators can be actuated using hardware buttons, switches, a joystick or keyboard, thumb switches or thumb pads, etc. The actuators can also be actuated using a virtual keyboard or other virtual actuators. In addition, where the screen on which they are displayed is a touch sensitive screen, the actuators can be actuated using touch gestures. Also, where the device that displays them has speech recognition components, the actuators can be actuated using speech commands.

A number of datastores have also been discussed. It will be noted they can each be broken into multiple datastores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that cross-platform computing system 102, identity providers 114-116, Auth provider 122, other secrets provider 118 and secrets datastore 120 can be located in cloud 502 (which can be public, private, or a combination where portions are public while others are private). The items shown in cloud 502 can also be in separate clouds or they can reside elsewhere. All of these architectures are contemplated herein.

Regardless of where they are located, the items can be accessed directly by clouds 110-112, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
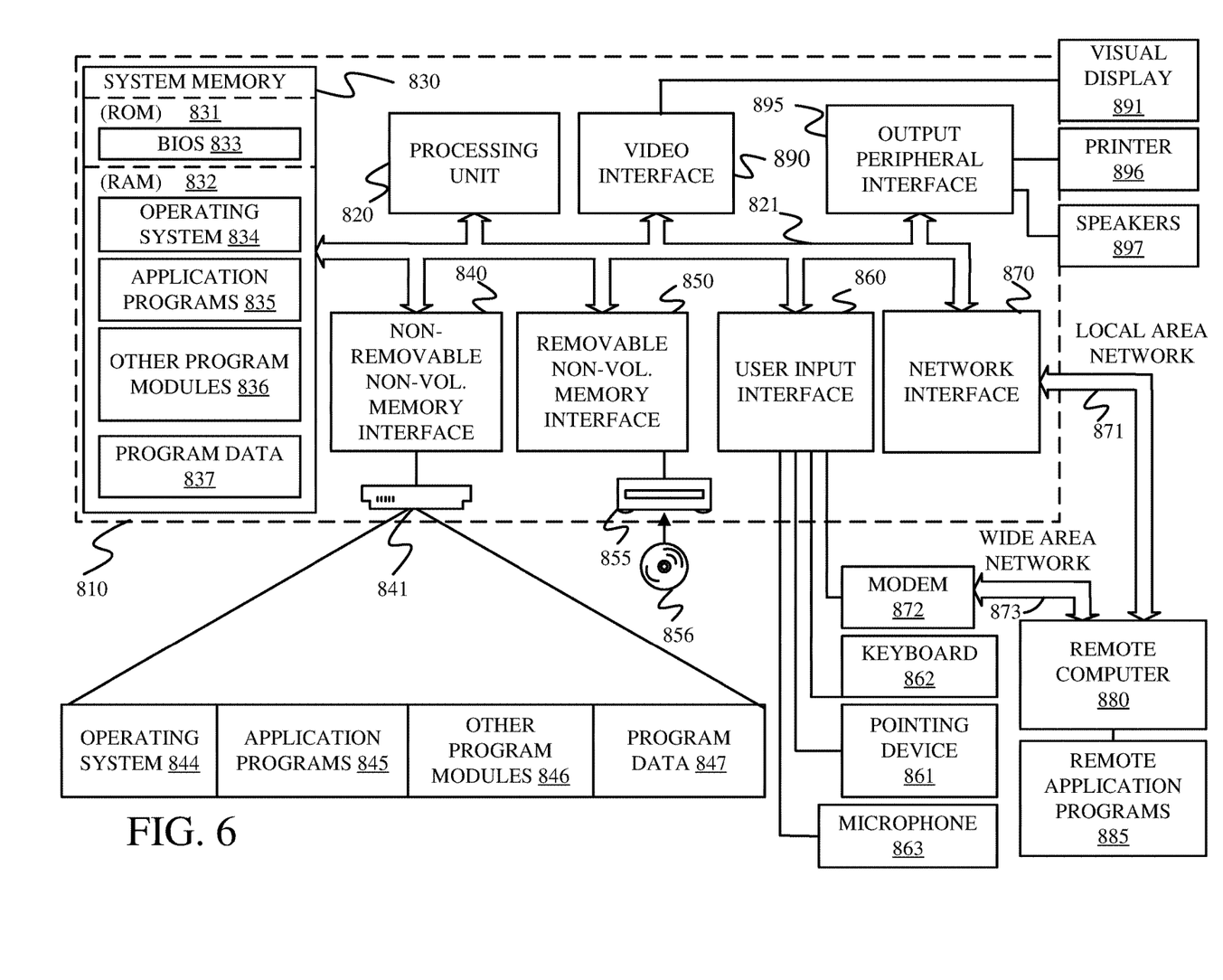
FIG. 6 is a block diagram showing one example of a computing environment that can be deployed in the architectures discussed with respect to other FIGS.

FIG. 6 is one example of a computing environment in which architecture 100, or parts of it, (for example) can be deployed. With reference to FIG. 6, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:

a deployment request processor that receives a request to deploy an application to a first platform;

an application availability group (AAG) assignment system that assigns the application to an AAG based on assignment criteria identified from the application, the AAG having a topology definition defining a topology of deployed instances; and a platform interaction system that sends the application and the topology definition to a control plane at the first platform for deployment of instances of the application on a capacity of the first platform based on the topology definition in the AAG to which the application is assigned.

Example 2 is the computing system of any or all previous examples wherein the deployment request processor is configured to receive a request to deploy the application to a second platform wherein the platform interaction system is configured to identify the AAG to which the application is assigned, obtain the topology definition from the identified AAG, and send the application and topology definition from the identified AAG to a control plane at the second platform for deployment of instances of the application on a capacity of the second platform based on the topology definition in the AAG to which the application is assigned.

Example 3 is the computing system of any or all previous examples wherein the application assignment system comprises:

an application parsing system configured to parse the application to identify the assignment criteria in the application; and an assignment engine configured to compare the assignment criteria identified in the application to assignment criteria corresponding to a plurality of different AAGs to identify a best matching AAG, and to assign the application to the best matching AAG.

Example 4 is the computing system of any or all previous examples and further comprising:

an identity management system that maintains an application identity corresponding to the application from an identity provider regardless of a platform on which the application is deployed, the application identity mapping to a security level in a datastore storing information having restricted access.

Example 5 is the computing system of any or all previous examples and further comprising:

an AAG definition system configured to expose an interface that detect definition inputs to generate definitions in the AAG, the definitions being independent of a platform on which the application is deployed.

Example 6 is the computing system of any or all previous examples wherein the AAG definition system comprises:

a topology definition system configured to expose a topology definition interface configured to receive topology definition inputs indicative of the topology of deployed instances and a sequence of deployment steps for application instances across the capacity of the first platform.

Example 7 is the computing system of any or all previous examples wherein the AAG definition system comprises:

a failure mode definition system configured to expose a failure mode definition interface configured to receive failure mode definition inputs indicative of failure mode processing to be performed when running the deployed instances, the failure mode definition being independent of a platform on which the application is deployed.

Example 8 is the computing system of any or all previous examples wherein, based on the deployment request processor receiving the request to deploy the application to the first platform, the platform interaction system is configured to identify the AAG to which the application is assigned and obtain the failure mode definition from the AAG and send the failure mode definition to the first platform.

Example 9 is the computing system of any or all previous examples wherein, based on the deployment request processor receiving the request to deploy the application to the second platform, the platform interaction system is configured to identify the AAG to which the application is assigned and obtain the failure mode definition from the AAG and send the failure mode definition to the second platform.

Example 10 is a computer implemented method, comprising:

receiving a request to deploy an application to a first platform;

assigning the application to an application availability group (AAG) based on assignment criteria identified from the application, the AAG having a topology definition defining a topology of deployed instances; and communicating the application and the topology definition to a control plane at the first platform for deployment of instances of the application on a capacity of the first platform based on the topology definition in the AAG to which the application is assigned.

Example 11 is the computer implemented method of any or all previous examples and further comprising:

receiving a request to deploy the application to a second platform;

identifying the AAG to which the application is assigned;

obtaining the topology definition from the identified AAG; and sending the application and topology definition from the identified AAG to a control plane at the second platform for deployment of instances of the application on a capacity of the second platform based on the topology definition in the identified AAG to which the application is assigned.

Example 12 is the computer implemented method of any or all previous examples wherein assigning the application to an AAG comprises:
parsing the application to identify the assignment criteria in the application;
comparing the assignment criteria identified in the application to assignment criteria corresponding to a plurality of different AAGs to identify a best matching AAG; and
assigning the application to the best matching AAG.

Example 13 is the computer implemented method of any or all previous examples and further comprising:
maintaining an application identity corresponding to the application from an identity provider regardless of a platform on which the application is deployed, the application identity mapping to a security level in a datastore storing information having restricted access.

Example 14 is the computer implemented method of any or all previous examples and further comprising:
exposing an interface that detect definition inputs; and
generating definitions in the AAG, the definitions being independent of a platform on which the application is deployed.

Example 15 is the computer implemented method of any or all previous examples wherein exposing an interface comprises:
exposing a topology definition interface configured to receive topology definition inputs indicative of the topology of deployed instances.

Example 16 is the computer implemented method of any or all previous examples wherein exposing an interface comprises:
exposing a failure mode definition interface configured to receive failure mode definition inputs indicative of failure mode processing to be performed when running the deployed instances, the failure mode definition being independent of a platform on which the application is deployed.

Example 17 is the computer implemented method of any or all previous examples wherein, based on receiving the request to deploy the application to the first platform:
identifying the AAG to which the application is assigned;
obtaining the failure mode definition from the AAG; and
sending the failure mode definition to the first platform.

Example 18 is the computer implemented method of any or all previous examples wherein, based on receiving the request to deploy the application to the second platform:
identifying the AAG to which the application is assigned;
obtaining the failure mode definition from the AAG; and
sending the failure mode definition to the second platform.

Example 19 is a cross-platform deployment computing system, comprising:
at least one processor; and
a datastore storing computer executable instructions which, when executed by the at least one processor, cause the at least one processor to implement:
a deployment request processor that receives a request to deploy an application to a first platform;
an application availability group (AAG) assignment system that assigns the application to an AAG based on assignment criteria identified from the application, the AAG having a topology definition defining a topology of deployed instances; and
a platform interaction system that sends the application and the topology definition to a control plane at the first platform for deployment of instances of the application on a capacity of the first platform based on the topology definition in the AAG to which the application is assigned.

Example 20 is the cross-platform deployment computing system of any or all previous examples wherein the computer executable instructions, when executed by the at least one processor, cause the deployment request processor to receive a request to deploy the application to a second platform and cause the platform interaction system to identify the AAG to which the application is assigned, obtain the topology definition from the identified AAG, and send the application and topology definition from the identified AAG to a control plane at the second platform for deployment of instances of the application on a capacity of the second platform based on the topology definition in the AAG to which the application is assigned.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   a deployment request processor that receives a request to deploy an application to a first platform;
   an application availability group (AAG) assignment system that assigns the application to an AAG based on assignment criteria identified from the application, the AAG having a topology definition defining a topology of deployed instances; and
   a platform interaction system that sends the application and the topology definition to a control plane at the first platform for deployment of instances of the application on a capacity of the first platform based on the topology definition in the AAG to which the application is assigned.

2. The computing system of claim 1 wherein the deployment request processor is configured to receive a request to deploy the application to a second platform wherein the platform interaction system is configured to identify the AAG to which the application is assigned, obtain the topology definition from the identified AAG, and send the application and the topology definition from the identified AAG to a control plane at the second platform for deployment of instances of the application on a capacity of the second platform based on the topology definition in the AAG to which the application is assigned.

3. The computing system of claim 1 wherein the application availability group assignment system comprises:
   an application parsing system configured to parse the application to identify the assignment criteria in the application; and
   an assignment engine configured to compare the assignment criteria identified in the application to assignment criteria corresponding to a plurality of different AAGs to identify a best matching AAG, and to assign the application to the best matching AAG.

4. The computing system of claim 2 and further comprising:
   an identity management system that maintains an application identity corresponding to the application from an identity provider regardless of a platform on which the application is deployed, the application identity mapping to a security level in a datastore storing information having restricted access.

5. The computing system of claim 4 and further comprising:

an AAG definition system configured to expose an interface that detect definition inputs to generate definitions in the AAG, the definitions being independent of a platform on which the application is deployed.

6. The computing system of claim 5 wherein the AAG definition system comprises:
a topology definition system configured to expose a topology definition interface configured to receive topology definition inputs indicative of the topology of deployed instances and a sequence of deployment steps for application instances across the capacity of the first platform.

7. The computing system of claim 5 wherein the AAG definition system comprises:
a failure mode definition system configured to expose a failure mode definition interface configured to receive failure mode definition inputs indicative of a failure mode definition that defines failure mode processing to be performed when running the deployed instances, the failure mode definition being independent of a platform on which the application is deployed.

8. The computing system of claim 7 wherein, based on the deployment request processor receiving the request to deploy the application to the first platform, the platform interaction system is configured to identify the AAG to which the application is assigned and obtain the failure mode definition from the AAG and send the failure mode definition to the first platform.

9. The computing system of claim 7 wherein, based on the deployment request processor receiving the request to deploy the application to the second platform, the platform interaction system is configured to identify the AAG to which the application is assigned and obtain the failure mode definition from the AAG and send the failure mode definition to the second platform.

10. A computer implemented method, comprising:
receiving a request to deploy an application to a first platform;
assigning the application to an application availability group (AAG) based on assignment criteria identified from the application, the AAG having a topology definition defining a topology of deployed instances; and
communicating the application and the topology definition to a control plane at the first platform for deployment of instances of the application on a capacity of the first platform based on the topology definition in the AAG to which the application is assigned.

11. The computer implemented method of claim 10 and further comprising:
receiving a request to deploy the application to a second platform;
identifying the AAG to which the application is assigned;
obtaining the topology definition from the identified AAG; and
sending the application and the topology definition from the identified AAG to a control plane at the second platform for deployment of instances of the application on a capacity of the second platform based on the topology definition in the identified AAG to which the application is assigned.

12. The computer implemented method of claim 10 wherein assigning the application to an AAG comprises:
parsing the application to identify the assignment criteria in the application;
comparing the assignment criteria identified in the application to assignment criteria corresponding to a plurality of different AAGs to identify a best matching AAG; and
assigning the application to the best matching AAG.

13. The computer implemented method of claim 11 and further comprising:
maintaining an application identity corresponding to the application from an identity provider regardless of a platform on which the application is deployed, the application identity mapping to a security level in a datastore storing information having restricted access.

14. The computer implemented method of claim 13 and further comprising:
exposing an interface that detect definition inputs; and
generating definitions in the AAG, the definitions being independent of a platform on which the application is deployed.

15. The computer implemented method of claim 14 wherein exposing an interface comprises:
exposing a topology definition interface configured to receive topology definition inputs indicative of the topology of deployed instances.

16. The computer implemented method of claim 14 wherein exposing an interface comprises:
exposing a failure mode definition interface configured to receive failure mode definition inputs indicative of a failure mode definition that defines failure mode processing to be performed when running the deployed instances, the failure mode definition being independent of a platform on which the application is deployed.

17. The computer implemented method of claim 16 wherein, based on receiving the request to deploy the application to the first platform:
identifying the AAG to which the application is assigned;
obtaining the failure mode definition from the AAG; and
sending the failure mode definition to the first platform.

18. The computer implemented method of claim 17 wherein, based on receiving the request to deploy the application to the second platform:
identifying the AAG to which the application is assigned;
obtaining the failure mode definition from the AAG; and
sending the failure mode definition to the second platform.

19. A cross-platform deployment computing system, comprising:
at least one processor; and
a datastore storing computer executable instructions which, when executed by the at least one processor, cause the at least one processor to implement:
a deployment request processor that receives a request to deploy an application to a first platform;
an application availability group (AAG) assignment system that assigns the application to an AAG based on assignment criteria identified from the application, the AAG having a topology definition defining a topology of deployed instances; and
a platform interaction system that sends the application and the topology definition to a control plane at the first platform for deployment of instances of the application on a capacity of the first platform based on the topology definition in the AAG to which the application is assigned.

20. The cross-platform deployment computing system of claim 19 wherein the computer executable instructions, when executed by the at least one processor, cause the deployment request processor to receive a request to deploy the application to a second platform and cause the platform interaction system to identify the AAG to which the application is assigned, obtain the topology definition from the identified AAG, and send the application and the topology definition from the identified AAG to a control plane at the second platform for deployment of instances of the application on a capacity of the second platform based on the topology definition in the AAG to which the application is assigned.

* * * * *